United States Patent
Tanabe et al.

(10) Patent No.: US 10,606,361 B2
(45) Date of Patent: Mar. 31, 2020

(54) ELECTRONIC DEVICE, CONTROL METHOD, AND NON-TRANSITORY COMPUTER-READABLE RECORDING MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Yasushi Kitamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/652,828

(22) Filed: Jul. 18, 2017

(65) Prior Publication Data

US 2018/0032141 A1 Feb. 1, 2018

(30) Foreign Application Priority Data

Jul. 27, 2016 (JP) .................. 2016-147891

(51) Int. Cl.
*G06F 3/01* (2006.01)
*G06F 3/0487* (2013.01)
*G06F 3/03* (2006.01)

(52) U.S. Cl.
CPC ............ *G06F 3/017* (2013.01); *G06F 3/0304* (2013.01); *G06F 3/0487* (2013.01)

(58) Field of Classification Search
None
See application file for complete search history.

(56) References Cited

U.S. PATENT DOCUMENTS

| | | | |
|---|---|---|---|
| 2010/0294938 A1 | 11/2010 | Alameh et al. | |
| 2014/0003629 A1* | 1/2014 | Reilly | F21V 23/0471 381/107 |
| 2014/0026105 A1* | 1/2014 | Eriksson | G04G 13/026 715/863 |
| 2015/0193032 A1* | 7/2015 | Saxena | G06F 1/1643 345/173 |
| 2015/0346831 A1 | 12/2015 | Nii | |
| 2015/0350551 A1* | 12/2015 | Harris | H04N 5/23216 348/231.99 |
| 2017/0192629 A1 | 7/2017 | Takada et al. | |

FOREIGN PATENT DOCUMENTS

| | | |
|---|---|---|
| JP | S60180055 U1 | 11/1985 |
| JP | S62158387 U1 | 10/1987 |
| JP | 2015053005 A | 3/2015 |
| JP | 2015225493 A | 12/2015 |

(Continued)

OTHER PUBLICATIONS

An Office Action issued by the Japanese Patent Office dated Feb. 6, 2018, which corresponds to Japanese Patent Application No. 2017-197947 and is related to U.S. Appl. No. 15/652,828; with English language Concise Explanation.

(Continued)

*Primary Examiner* — Carl Adams
(74) *Attorney, Agent, or Firm* — Studebaker & Brackett PC (57) ABSTRACT

An electronic device includes a non-contact detection sensor and a controller that executes processing related to a timer in response to a gesture detected by the non-contact detection sensor.

12 Claims, 8 Drawing Sheets

(56) References Cited

FOREIGN PATENT DOCUMENTS

| JP | 2016-018223 A | 2/2016 |
|---|---|---|
| WO | 2016072271 A1 | 5/2016 |
| WO | 2016098519 A1 | 6/2016 |

OTHER PUBLICATIONS

Nikkei Business Publications, Inc., Creating things with near-future Linux: Now you can make "Google Glass" as well as gesture input device!, Nikkei Linux dated Sep. 8, 2013, p. 2-10.
Gijyutsu-Hyohron Co., Ltd., Complete encyclopedia 2015 edition, PLUS Android Apps ready to use with ease, Feb. 1, 2015, p. 2-5.
Information Processing Society of Japan, Development and evaluation of a cooking guidance assistance system in handmade cooking using Leap Motion, by Ayako Ikeda, in Proceedings of the 78th (2016) Annual Convention (4), Mar. 10, 2016.
Information Processing Society of Japan, Study on mobile applications for recognizing hand gestures by build-in illumination intensity sensor, by Daisuke Yamashita, in IPSJ SIG Ubiquitous Computing System (UBI) Technical Report, Dec. 4, 2015, p. 1-8.
Impress Corporation, iPad Apps 300 Encyclopedia, by Libroworks Ink., May 1, 2012.
Nikkei Business Publications, Inc., Windows 8.1 easy to learn, school standard textbook, by Yuki Masuda, Nov. 25, 2013.

An Office Action; "Notice of Reasons for Rejection," mailed by the Japanese Patent Office dated Nov. 8, 2016, which corresponds to Japanese Patent Application No. 2016-147891; with English language Concise Explanation.
An Office Action; "Notice of Reasons for Rejection," mailed by the Japanese Patent Office dated Feb. 14, 2017, which corresponds to Japanese Patent Application No. 2016-147891; with English language Concise Explanation.
An Office Action; "Notice of Reasons for Rejection," mailed by the Japanese Patent Office dated Feb. 14, 2017, which corresponds to Japanese Patent Application No. 2016-239455; with English language Concise Explanation.
An Office Action; "Notice of Reasons for Rejection," mailed by the Japanese Patent Office dated Feb. 14, 2017, which corresponds to Japanese Patent Application No. 2016-248031; with English language Concise Explanation.
An Office Action; "Notice of Reasons for Rejection," mailed by the Japanese Patent Office dated Feb. 14, 2017, which corresponds to Japanese Patent Application No. 2016-248032; with English language Concise Explanation.
An Office Action; "Notice of Reasons for Rejection," mailed by the Japanese Patent Office dated Jul. 11, 2017, which corresponds to Japanese Patent Application No. 2016-248031; with English language Concise Explanation.

* cited by examiner

ELECTRONIC DEVICE, CONTROL METHOD, AND NON-TRANSITORY COMPUTER-READABLE RECORDING MEDIUM

CROSS-REFERENCE TO RELATED APPLICATION

This application claims priority to and the benefit of Japanese Patent Application No. 2016-147891 filed Jul. 27, 2016, the entire contents of which are incorporated herein by reference.

TECHNICAL FIELD

This disclosure relates to an electronic device, a control method, and a non-transitory computer-readable recording medium.

BACKGROUND

Such a mobile terminal is known as to use an infrared sensor to recognize a gesture performed by the user.

SUMMARY

It would be helpful to provide an electronic device, a control method, and a non-transitory computer-readable recording medium that can improve operability when executing processing related to a certain functionality.

An electronic device according to one aspect includes:
a non-contact detection sensor; and
a controller configured to execute processing related to a timer in response to a gesture detected by the non-contact detection sensor.

A control method according to another aspect is for an electronic device including a non-contact detection sensor and a controller, the control method including:
executing processing related to a timer in response to a gesture detected by the non-contact detection sensor.

A non-transitory computer-readable recording medium according to another aspect includes computer program instructions, which when executed by an electronic device comprising a non-contact detection sensor and a controller, cause the electronic device to:
execute processing related to a timer in response to a gesture detected by the non-contact detection sensor.

The electronic device, control method, and non-transitory computer-readable recording medium according to this embodiment can improve operability when executing processing related to a timer.

DETAILED DESCRIPTION

Figure 1:
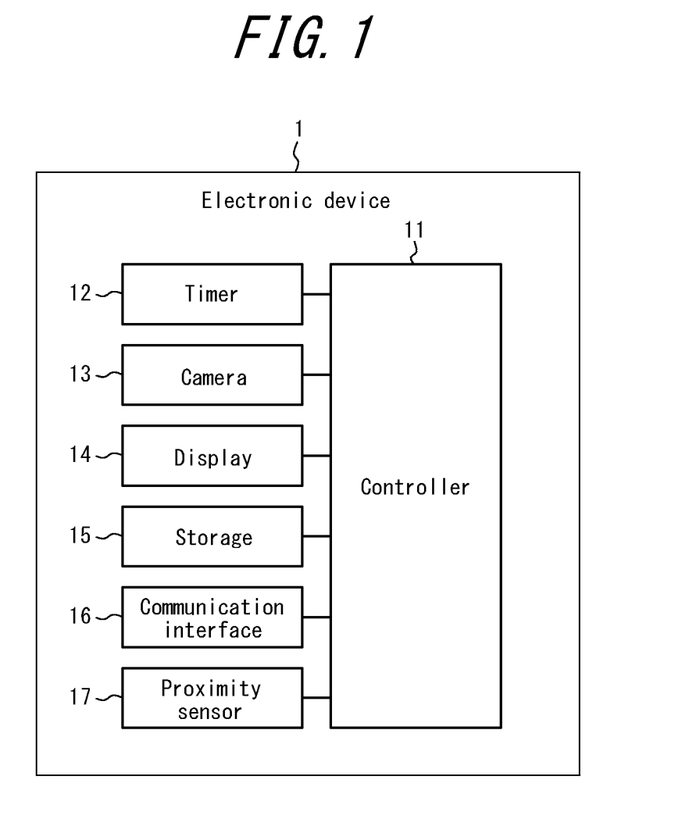
FIG. 1 is a schematic configuration diagram of an electronic device according to one embodiment.

As illustrated in FIG. 1, an electronic device 1 according to one embodiment includes a controller 11, a timer 12, a camera 13, a display 14, a storage 15, a communication interface 16, and a proximity sensor 17. Since FIG. 1 is only an example, the electronic device 1 need not include all of the components illustrated in FIG. 1. Also, the electronic device 1 may include components other than those illustrated in FIG. 1.

The controller 11 is a processor such as a Central Processing Unit (CPU). The controller 11 may be a System-on-a-Chip (SoC) or other type of integrated circuit in which other components are integrated. The controller 11 may be configured by combining a plurality of integrated circuits. The controller 11 implements a variety of functions by comprehensively controlling operations of the electronic device 1.

In greater detail, the controller 11 refers as necessary to data stored in the storage 15. The controller 11 implements a variety of functions by executing instructions included in programs stored in the storage 15 to control other functional components, such as the display 14.

The timer 12 receives an instruction for a timer operation from the controller 11. Once a predetermined time has elapsed, the timer 12 outputs a signal indicating that the time has elapsed to the controller 11. When a predetermined time is reached, the timer 12 can output a signal indicating so to the controller 11. The timer 12 may be provided external to the controller 11, as illustrated in FIG. 1, or may be included within the controller 11.

The camera 13 captures images of subjects around the electronic device 1. As an example, the camera 13 in one embodiment is a front camera provided at the upper portion of the face of the electronic device 1 where the display 14 is provided. The camera 13 is one example of a non-contact detection sensor and can detect a gesture by the user by referring to the result of image analysis performed on a captured image.

The display 14 is provided with a display device such as a liquid crystal display or an organic electro-luminescence panel. The display 14 may instead be provided with an inorganic electro-luminescence panel. The display 14 can display information such as letters, images, symbols, or graphics. The display 14 may include a touchscreen and detect contact on the touchscreen by a finger, stylus pen, or other object. Such contact may include a flick. The display 14 can detect the position on the touchscreen contacted by a plurality of fingers, stylus pens, or other objects. The display 14 is provided in the electronic device 1 in FIG. 1, but the display 14 may be provided outside of the electronic device 1.

The storage 15 functions as a memory storing programs and data. The storage 15 temporarily stores the processing result of the controller 11. For example, the storage 15 stores the type of screen operation allocated to (associated with) each gesture operation. The storage 15 may include any storage device, such as a semiconductor storage device or a magnetic storage device. The storage 15 may also include a plurality of types of storage devices. The storage 15 may include a combination of a portable storage medium, such as a memory card, and an apparatus for reading the storage medium.

The programs stored in the storage 15 include applications that run in the foreground or the background and a control program that supports operations of the applications. The applications for example cause the controller 11 to execute processing corresponding to a gesture. The control program may, for example, be an Operating System (OS). The applications and the control program may be installed on the storage 15 through wireless communication by the communication interface 16 or from a storage medium.

The communication interface 16 is for communicating over a wired or wireless connection. The communication method of the communication interface 16 in one embodiment is prescribed by a wireless communication standard. For example, a cellular phone communication standard such as 2G, 3G, or 4G may be used as the wireless communication standard. Examples of cellular phone communication standards include Long Term Evolution (LTE), Wideband Code Division Multiple Access (W-CDMA), CDMA2000, Personal Digital Cellular (PDC), Global System for Mobile communications (GSM® (GSM is a registered trademark in Japan, other countries, or both)), and Personal Handy-phone System (PHS). Examples of wireless communication standards include Worldwide Interoperability for Microwave Access (WiMAX), Institute of Electrical and Electronics Engineers (IEEE) 802.11, Bluetooth® (Bluetooth is a registered trademark in Japan, other countries, or both), Infrared Data Association (IrDA), and Near Field Communication (NFC). The communication interface 16 may support one or more of the aforementioned communication standards.

The proximity sensor 17 is one example of a non-contact detection sensor. Without contact, the proximity sensor 17 detects information such as the relative distance from an object near the electronic device 1 and the movement direction (gesture) of the object. As an example in one embodiment, the proximity sensor 17 is described as being used as the non-contact detection sensor. Alternatively, the camera 13 may be used as the non-contact detection sensor. The proximity sensor 17 in one embodiment includes four visible light photodiodes that can detect white, red, green, and blue. The proximity sensor 17 can measure the relative distance from the object. The proximity sensor 17 also includes one infrared Light Emitting Diode (LED) acting as a light source and four infrared photodiodes that detect the up, down, left, and right directions. An object is irradiated by infrared light from the infrared LED acting as a light source, and the proximity sensor 17 detects the movement direction of the object by the difference in time at which reflected light from the object is incident on each of the infrared photodiodes. Accordingly, the proximity sensor 17 can detect an air gesture (gesture) that the user of the electronic device 1 performs without touching the electronic device 1.

Figure 2:
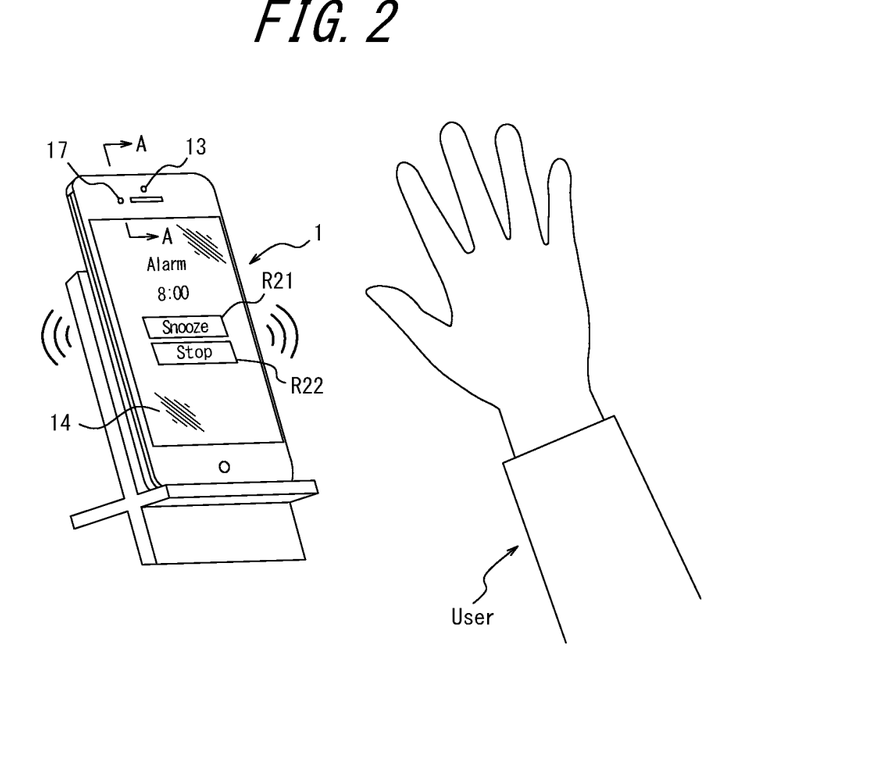
FIG. 2 illustrates operation of an electronic device with a gesture.

FIG. 2 illustrates the user operating the electronic device 1. In FIG. 2, the electronic device 1 is supported on a stand as an example. Alternatively, the electronic device 1 may be supported against a wall.

The electronic device 1 in FIG. 2 is a smartphone. Alternatively, the electronic device 1 may, for example, be a mobile phone, a phablet, a tablet Personal Computer (PC), a feature phone, or other such device. The electronic device 1 is not limited to these examples and may be any electronic device such as a Personal Digital Assistant (PDA), remote control, portable music player, game machine, household appliance, or industrial device (Factory Automation (FA) device). Furthermore, the electronic device 1 may be any device that includes the display 14, such as a desktop PC, a bank Automatic Teller Machine (ATM), a ticket machine at a train station, a digital camera, or an e-book reader.

The electronic device 1 provided with the display 14 may also be adopted in an in-vehicle control panel mounted in the steering wheel, car navigation, or dashboard of an automobile, or may be adopted in any other type of transportation.

As illustrated in FIG. 2, the camera 13 and proximity sensor 17 are disposed at the upper portion of the electronic device 1.

Figure 3:
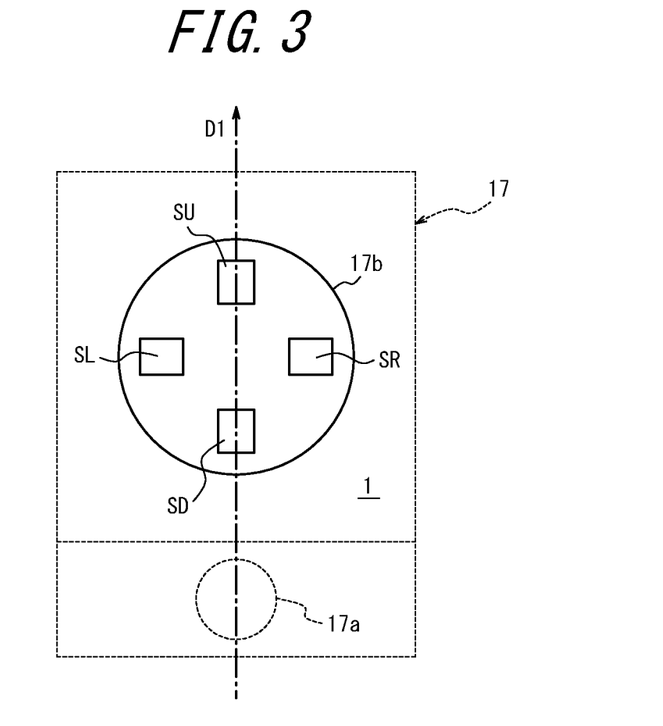
FIG. 3 schematically illustrates a proximity sensor.

The method for the controller 11 to detect a gesture by the user by referring to the output of the proximity sensor 17 is described below in detail with reference to FIGS. 3 and 4. FIG. 3 illustrates the proximity sensor 17 when the electronic device 1 is viewed from the front. The proximity sensor 17 includes an infrared LED 17a that acts as a light source and four infrared photodiodes that detect the up, down, left, and right directions. The infrared photodiode positioned upwards in FIG. 3 is referred to as sensor SU, the infrared photodiode positioned to the right as sensor SR, the infrared photodiode positioned downwards as sensor SD, and the infrared photodiode positioned to the left as sensor SL. Sensor SU, sensor SD, sensor SL, and sensor SR are arranged in the up, down, left, and right directions at approximately equal intervals.

FIG. 3 is a cross-section along the A-A line in FIG. 2. The sensor SD, sensor SL, sensor SR, and sensor SU detect reflected light from the object of detection through the lens 17b.

Figure 4:
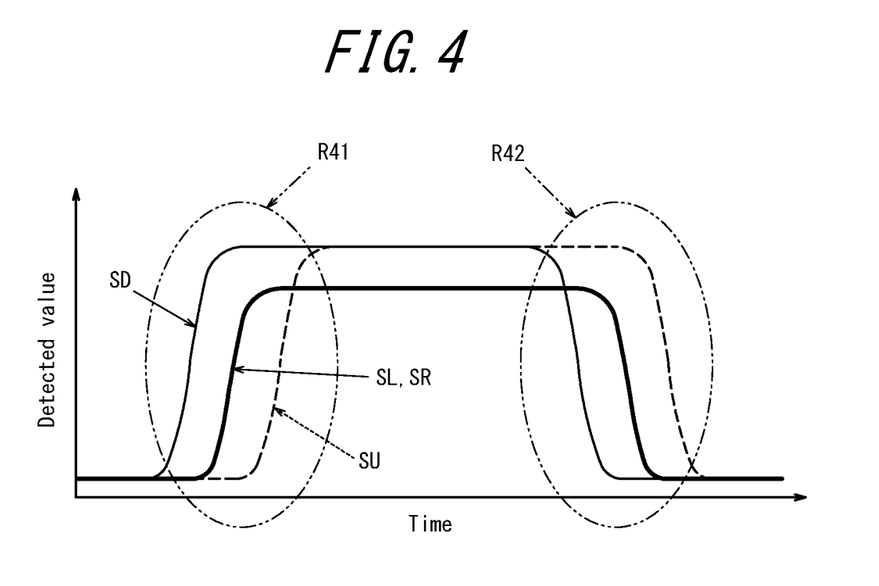
FIG. 4 illustrates the change over time in the value detected by each sensor.

FIG. 4 illustrates the change over time in the value of light detected by the sensor SD, sensor SL, sensor SR, and sensor SU when the object of detection, such as the user's hand, moves through space in the direction D1 in FIG. 3. The direction D1 is roughly parallel to the longitudinal direction of the electronic device 1.

As illustrated in FIG. 4, in region R41, the value detected by sensor SD is higher than the value detected by sensor SU. Therefore, the value of the integral upon integrating the following difference over time is positive.

(value detected by sensor SD)−(value detected by sensor SU)

At this time, the controller 11 determines that the object of detection has passed near the starting point in the direction D1.

In region R42, the value detected by sensor SD is lower than the value detected by sensor SU. Therefore, the value of the integral upon integrating the following difference over time is negative.

(value detected by sensor SD)−(value detected by sensor SU)

At this time, the controller 11 determines that the object of detection has passed near the end point in the direction D1.

In this way, by referring to the value detected by sensor SD and the value detected by sensor SU, the controller 11 can detect that the object of detection has moved in the direction D1. Similarly, by referring to whether the value of the integral is positive or negative upon integrating the difference between the value detected by sensor SL and the value detected by sensor SR over time, the controller 11 can detect that the object of detection has moved in a direction roughly parallel to the transverse direction of the electronic device 1.

By using the values detected by all of sensor SD, sensor SL, sensor SR, and sensor SU, the controller 11 can determine in detail the way in which the object of detection has moved, i.e. what type of gesture has been performed.

Alternatively, by determining the degree of temporal shift between the peaks of the values detected by the four sensors, the controller 11 can determine in detail the direction in which the object of detection has moved.

The detected gesture may be a horizontal gesture, vertical gesture, diagonal gesture, a gesture to move closer to or away from the electronic device 1, a gesture to draw a circle clockwise, a gesture to draw a circle counterclockwise, or other such gesture. For example, the horizontal gesture is performed in a direction roughly parallel to the transverse direction of the electronic device 1. The vertical gesture is performed in a direction roughly parallel to the longitudinal direction of the electronic device 1. The diagonal gesture is performed in a plane roughly parallel to the electronic device 1 in a direction not parallel to either the longitudinal direction or the transverse direction of the electronic device 1.

Referring again to FIG. 2, the following describes the processing, related to the timer, that the controller 11 of the electronic device 1 according to one embodiment executes in response to a gesture. The controller 11 determines whether the electronic device 1 has entered a predetermined mode in response to user operation. The predetermined mode in one embodiment is, for example, a mode in which an alarm rings at a time set in advance by the user, but the predetermined mode may include any mode on the electronic device 1.

In one embodiment, the proximity sensor 17 is one example of a non-contact detection sensor, and whether the proximity sensor 17 is on depends on the whether the timer is on. Accordingly, upon detecting that the alarm is ringing, the controller 11 turns the proximity sensor 17 on. At this time, the controller 11 may turn off the display 14 in order to reduce power consumption. The controller 11 may turn the display 14 on upon detecting a gesture.

In one embodiment, as illustrated in FIG. 2, the controller 11 displays a screen on the display 14 indicating that the alarm is ringing. Upon detecting a predetermined gesture by the user (such as a horizontal gesture) on this screen by referring to the output of the proximity sensor 17, the controller 11 stops ringing of the alarm (stops the alarm) and activates a snooze function as one example of processing related to the timer. In other words, the controller 11 rings the alarm again upon detecting, with the timer 12, that a predetermined time has elapsed after stopping the alarm. The user can freely set this predetermined time. The controller 11 may also stop the alarm and activate the snooze function for example upon detecting that a region R21, displaying the word "snooze", on the display 14 has been selected by contact.

The controller 11 instead stops further ringing of the alarm without activating the snooze function for example upon detecting that a region R22, displaying the word "stop", on the display 14 has been selected by contact. The controller 11 may also stop the alarm without activating the snooze function for example upon determining that the speed of the gesture is at least a predetermined value.

In one embodiment, when the alarm rings again because of the snooze function, the controller 11 again displays a screen indicating that the alarm is ringing. As one example of processing related to the timer, the controller 11 stops the alarm and continues the snooze function upon detecting a predetermined gesture by the user. In other words, the controller 11 rings the alarm again when a predetermined time has elapsed. Upon detecting that the region R22 has been selected by contact, the controller 11 instead deactivates the snooze function and stops further ringing of the alarm. The controller 11 may also deactivate the snooze function and stop further ringing of the alarm upon determining that the speed of the gesture is at least a predetermined value. Additionally, the controller 11 may deactivate the snooze function upon determining that the number of times the alarm has been stopped by a gesture exceeds a predetermined value set by the user.

Figure 5:
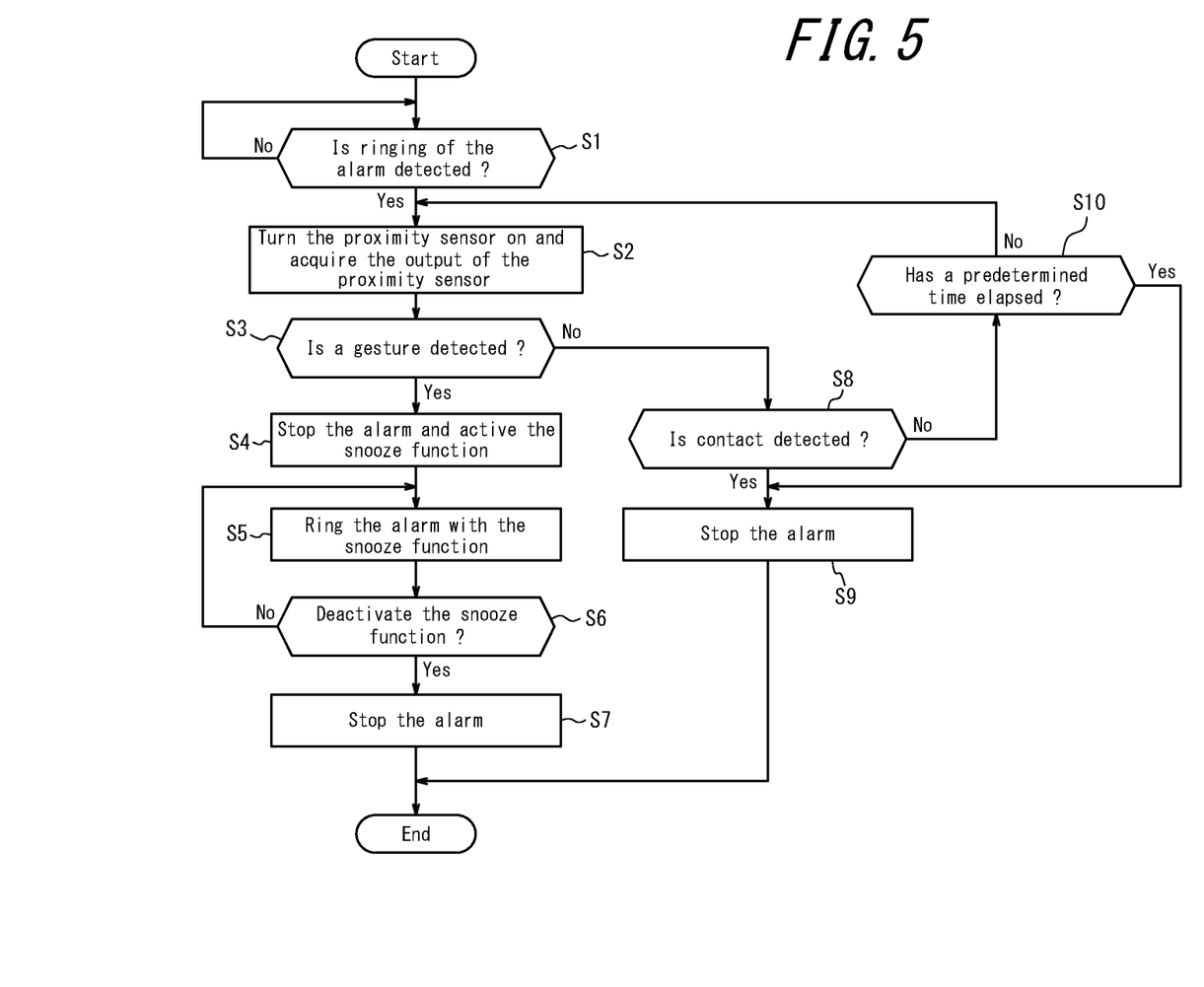
FIG. 5 is a flowchart illustrating an example of processing executed by an electronic device according to one embodiment.

FIG. 5 is a flowchart illustrating an example of a control method executed by the electronic device 1 according to one embodiment.

Upon detecting that the alarm is ringing (step S1: Yes), the electronic device 1 turns the proximity sensor 17 on and acquires the output of the proximity sensor 17 (step S2).

Upon detecting a gesture by the user (step S3: Yes), the electronic device 1 stops the alarm and activates the snooze function (step S4). Once a predetermined time elapses after stopping the alarm, the electronic device 1 rings the alarm again with the snooze function (step S5).

The electronic device 1 determines whether the snooze function has been deactivated (step S6). Alternatively, the electronic device 1 may perform step S6 between steps S4 and S5. Since the method for determining whether the snooze function has been deactivated is as described above, further description is omitted here. Upon determining that the snooze function has been deactivated (step S6: Yes), the electronic device 1 stops the alarm (step S7).

When the electronic device 1 does not detect a gesture (step S3: No) but detects contact on the display 14 (step S8: Yes), the electronic device 1 stops the alarm (step S9). When not detecting contact on the display 14 (step S8: No), the electronic device 1 determines whether a predetermined time has elapsed since detecting ringing of the alarm in step S1 (step S10). When determining that a predetermined time has not elapsed (step S10: No), the electronic device 1 returns to step S2. Otherwise, when determining that a predetermined time has elapsed (step S10: Yes), the electronic device 1 stops the alarm (step S9).

As described above, according to the above embodiment, the controller 11 executes processing related to the timer in response to a gesture detected by the proximity sensor 17, which is one example of a non-contact detection sensor. As a result, by performing a gesture, the user can cause processing related to the timer to be executed, such as stopping the alarm and activating the snooze function. The usability of the electronic device 1 thus improves. Also, the snooze function can be activated and deactivated with different operations, allowing the operation method to separate between these functions.

According to the above embodiment, whether the proximity sensor 17 is on depends on whether the timer is on. As a result, the proximity sensor 17 does not always need to be on, allowing the power consumption of the electronic device 1 to be reduced.

Other Embodiment

Next, another embodiment is described. The predetermined mode in the above embodiment is a mode in which the alarm is ringing. In another embodiment, the predetermined mode is a kitchen mode in which an application that displays a cooking recipe on the display 14 or other such application has been launched.

Upon detecting that the electronic device 1 has entered a predetermined mode in response to user operation, the controller 11 causes a predetermined screen (first screen) to be displayed on the display 14. The first screen includes the text, images, and other information of a cooking recipe. As one example, only vertical scrolling is possible on the first screen, and horizontal scrolling is not possible. Other than vertical and horizontal scrolling, the operations that may be performed on the screen for example may include a page forward, a page back, a pinch-in, a pinch-out, or other such operation.

Upon detecting that the electronic device 1 has entered a predetermined mode, the controller 11 turns on the proximity sensor 17 and acquires output of the proximity sensor 17.

When the controller 11 refers to the output of the proximity sensor 17 and detects that a vertical gesture has been performed, the controller 11 vertically scrolls the first screen.

When the controller 11 refers to the output of the proximity sensor 17 and instead detects that a horizontal gesture has been performed, the controller 11 determines whether a timer indication is included in the first screen. The timer indication refers to an indication of the need to measure a predetermined length of time, such as "boil for 10 minutes over medium heat" or "steam for 10 to 15 minutes".

Figure 6:
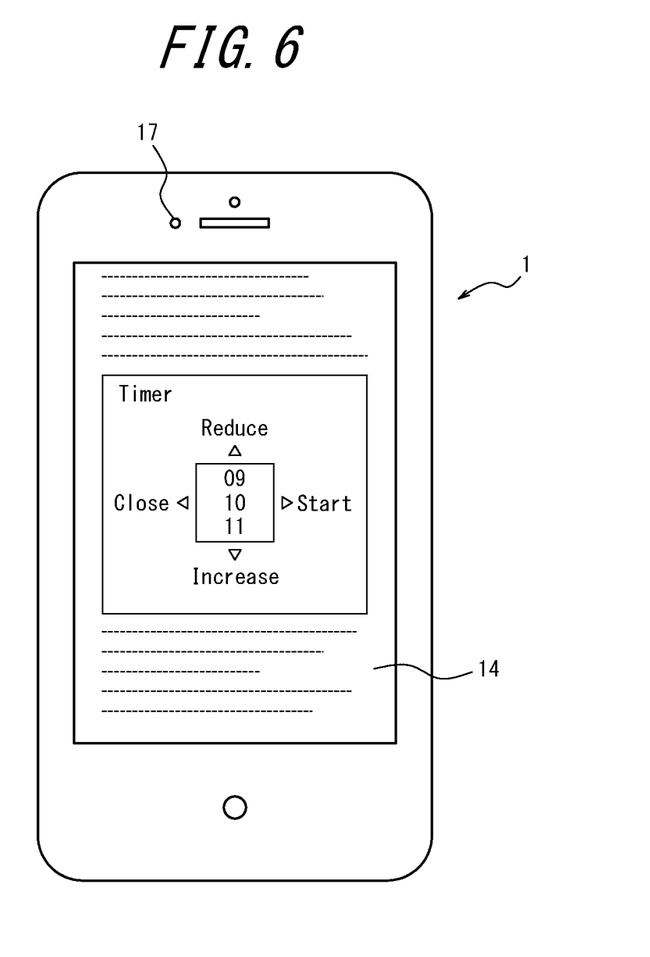
FIG. 6 illustrates an electronic device according to another embodiment.

Upon determining that a timer indication is included in the screen displayed on the display 14, the controller 11 displays the timer setting window, illustrated in FIG. 6, in partial overlap with the first screen. At this time, the controller 11 can display the timer setting window at any size and at any position. For example, the controller 11 may display the timer setting window at a position so as not to overlap the aforementioned timer indication. The controller 11 may also determine that the content displayed above the timer indication has already been read by the user and need not be viewable. The controller 11 may therefore display the timer setting window at a position above the timer indication. Since it is not essential that the timer setting window be displayed in partial overlap with the first screen, the controller 11 may also display the timer setting window over the entire display 14.

Upon displaying the timer setting window on the display 14, the controller 11 executes processing related to the timer as follows in response to a gesture detected by the proximity sensor 17.

Upon detecting an upwards gesture, the controller 11 decreases the time of the timer by one minute for each gesture. An upwards gesture refers to a gesture, among vertical gestures, that moves roughly upwards in a front view of the electronic device 1. The time may be decreased in increments other than one minute, such as 30 seconds or 10 seconds. Upon detecting a downwards gesture, the controller 11 increases the time of the timer by one minute for each gesture. The time may be increased in increments other than one minute, such as 30 seconds or 10 seconds. A downwards gesture refers to a gesture, among vertical gestures, that moves roughly downwards in a front view of the electronic device 1. The increments for decreasing and increasing the time may be identical or different. The time of the timer can be changed in this way, allowing the user to set a different time than the time indicated on the recipe screen.

Upon detecting a gesture to the left, the controller 11 closes the timer setting window. At this time, an operation on the first screen may be performed. A gesture to the left refers to a gesture, among horizontal gestures, that moves roughly to the left in a front view of the electronic device 1. Upon detecting a gesture to the right, the controller 11 starts the timer. Upon detecting that a gesture to the right has been performed after the start of the timer, the controller 11 pauses the timer. A gesture to the right refers to a gesture, among horizontal gestures, that moves roughly to the right in a front view of the electronic device 1.

In this way, in another embodiment, gestures may be associated with only a portion of the functions of the timer, such as setting the time of the timer and starting or stopping the timer.

Figure 7:
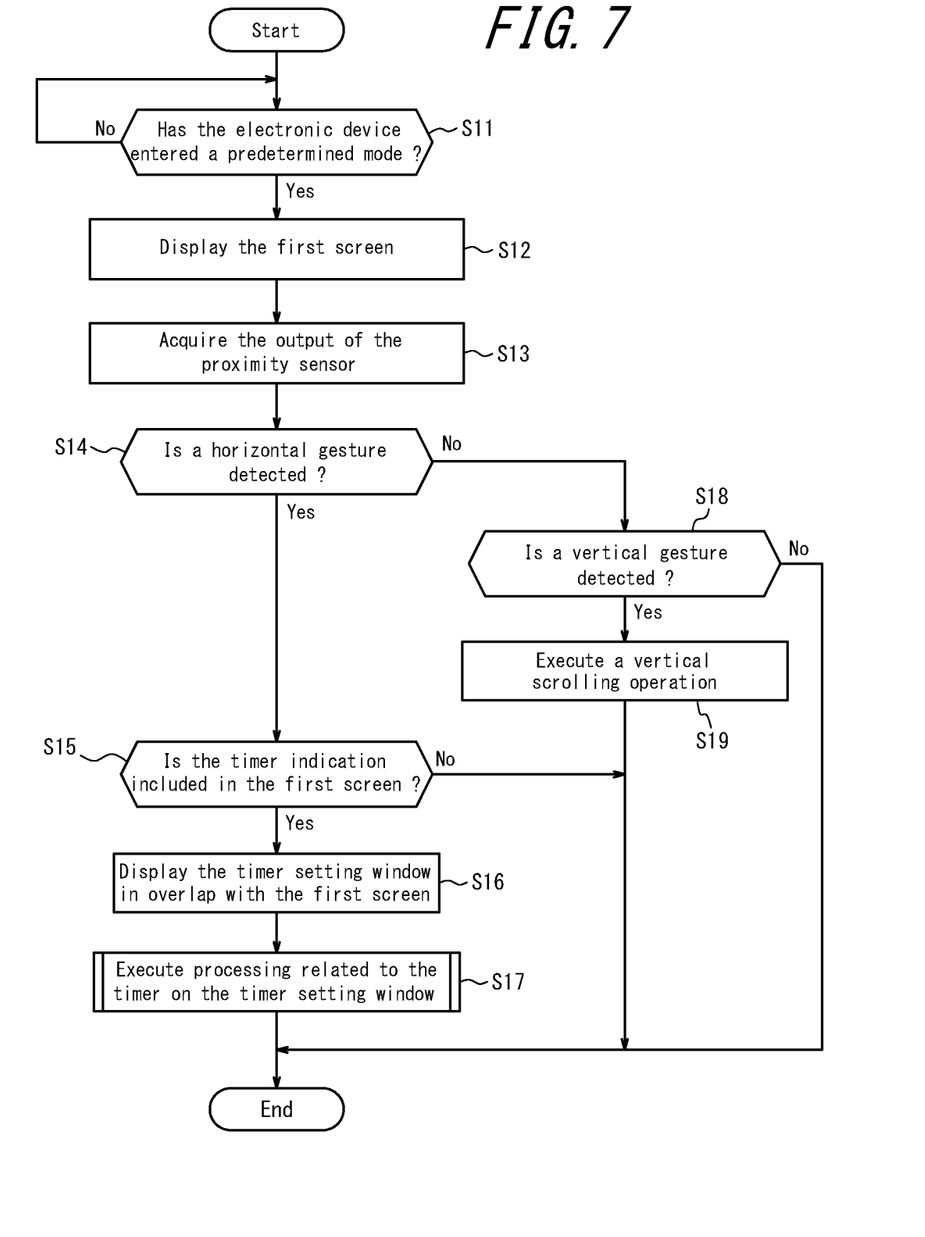
FIG. 7 is a flowchart illustrating an example of processing executed by an electronic device according to another embodiment.

FIG. 7 is a flowchart illustrating an example of the control method executed at regular or irregular intervals by the electronic device 1 according to one embodiment.

Upon detecting that the electronic device 1 has entered a predetermined mode (step S11: Yes), the electronic device 1 displays the first screen (step S12) and acquires the output of the proximity sensor 17 (step S13). As one example, the first screen is described as only allowing vertical scrolling and not allowing horizontal scrolling. When the electronic device 1 refers to the output of the proximity sensor 17 and detects a horizontal gesture (step S14: Yes), the electronic device 1 determines whether a timer indication is included in the first screen (step S15). When determining that a timer indication is included (step S15: Yes), the electronic device 1 displays the timer setting window in overlap with the first screen (step S16).

The electronic device 1 executes processing related to the timer on the timer setting window (step S17). The processing related to the timer is described below with reference to FIG. 8.

When not detecting the horizontal gesture (step S14: No), the electronic device 1 determines whether a vertical gesture is detected (step S18). Upon detecting a vertical gesture (step S18: Yes), the electronic device 1 vertically scrolls the first screen (step S19).

Figure 8:
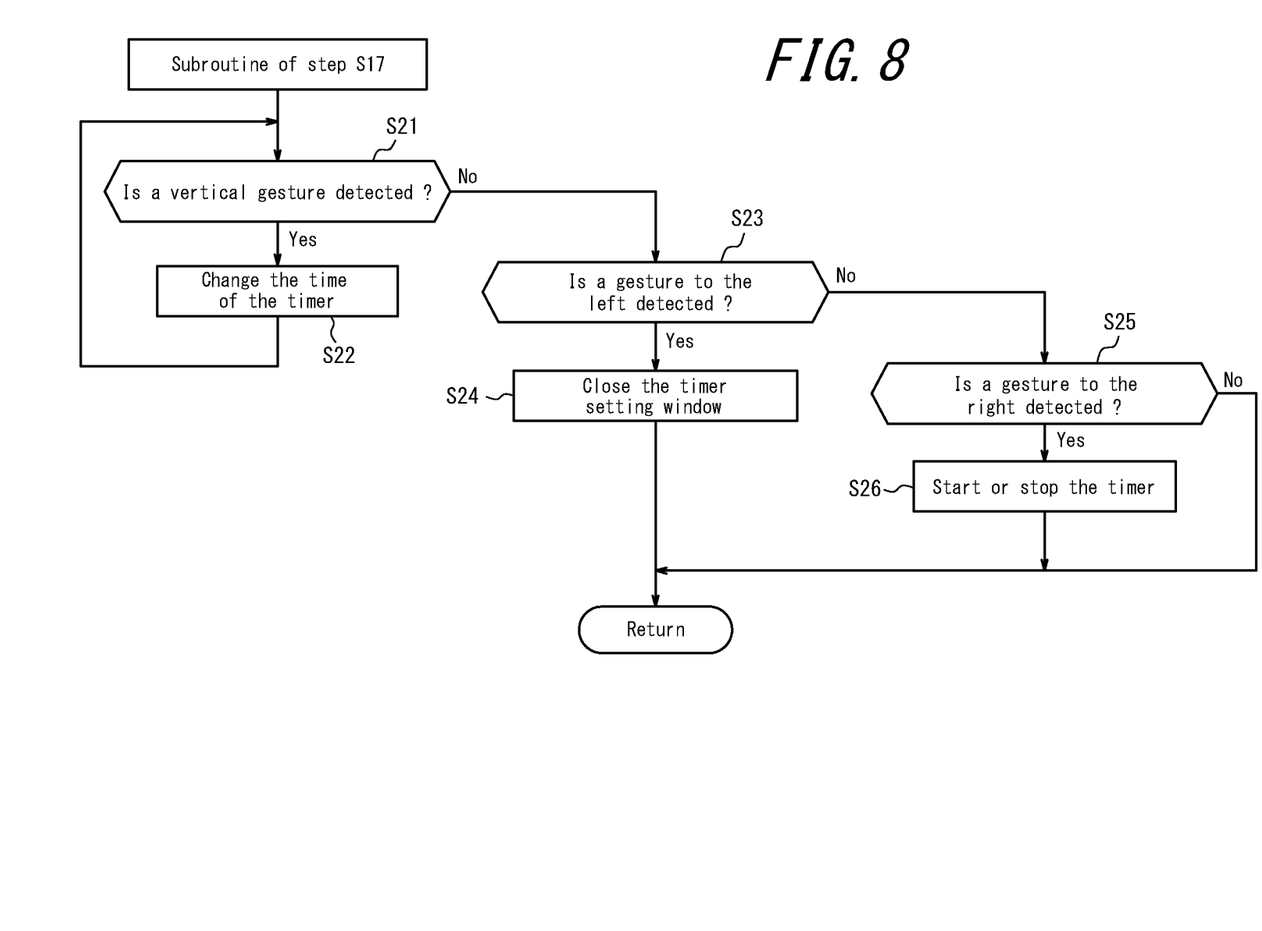
FIG. 8 illustrates the subroutine in step S17 of FIG. 7.

FIG. 8 illustrates the subroutine in step S17 of FIG. 7.

Upon detecting a vertical gesture while the timer setting window is displayed (step S21: Yes), the electronic device 1 changes the time of the timer (step S22). Since the method for changing the time of the timer is as described in the above embodiment, further description is omitted here.

When not detecting a vertical gesture (step S21: No), the electronic device 1 determines whether a gesture to the left is detected (step S23). Upon detecting a gesture to the left (step S23: Yes), the electronic device 1 closes the timer setting window (step S24). Conversely, when not detecting a gesture to the left (step S23: No), the electronic device 1 determines whether a gesture to the right is detected (step S25). Upon detecting a gesture to the right (step S25: Yes), the electronic device 1 starts or stops the timer (step S26).

As described above, according to the above embodiment, the controller 11 executes processing related to the timer in response to a gesture detected by the proximity sensor 17, which is one example of a non-contact detection sensor. As a result, by performing a gesture, the user can cause processing related to the timer to be executed, such as setting the time of the timer or starting the timer. Therefore, when the user does not wish to contact the electronic device 1, for example when the user's hands are dirty while cooking or when the electronic device 1 is wet, the user can operate the timer of the electronic device 1 without contacting the electronic device 1. Also, the user does not need to launch a new application to measure time. The operability of the electronic device 1 is thereby improved. Furthermore, the proximity sensor 17 does not always need to be on, allowing the power consumption of the electronic device 1 to be reduced.

According to the above embodiment, gestures are only associated with a portion of the functions of the timer. As a result, the operations performable by gesture can be limited to the main functions of the timer. The electronic device 1 can therefore be prevented from malfunctioning because of an air gesture, for which movement cannot be detected as finely as with a touch panel.

Modifications

The camera 13, display 14, and proximity sensor 17 may be disposed at any position. For example, the proximity sensor 17 is provided at the upper portion of the electronic device 1 in the above embodiments but may be provided instead at the lower portion.

In the above-described other embodiment, only vertical scrolling is possible on the first screen, and horizontal scrolling is not possible. In a modification, however, only horizontal scrolling is possible. In this case, upon detecting a vertical gesture, the controller 11 determines whether a timer indication is displayed in the first screen and executes processing related to the timer on the displayed timer setting window. When detecting a horizontal gesture, the controller 11 scrolls the first screen horizontally.

In the above embodiment, upon detecting a gesture, the controller 11 stops the alarm and activates the snooze function. In a modification, the controller 11 may stop the alarm without activating the snooze function upon detecting a gesture.

The processing executed when the controller 11 detects a particular gesture may be switched freely. For example, in the above-described other embodiment, the controller 11 may start the timer upon detecting a gesture to the left and may close the timer setting window upon detecting a gesture to the right.

Much of the subject matter of the present disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), a mobile (cellular) phone, a mobile phone with a data processing function, a Radio Frequency IDentification (RFID) receiver, a game machine, an electronic notepad, a laptop computer, a GPS receiver, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like include, for example, one or more of a microprocessor, CPU, Application Specific Integrated Circuit (ASIC), Digital Signal Processor (DSP), Programmable Logic Device (PLD), Field Programmable Gate Array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a Compact Disc (CD), laser Disc®, Digital Versatile Disc (DVD®), Floppy® disk, and Blu-ray Disc® (laser disc, DVD, floppy, and Blu-ray Disc are registered trademarks in Japan, other countries, or both). Further examples include a portable computer disk, Random Access Memory (RAM), Read-Only Memory (ROM), rewritable programmable ROM such as Erasable Programmable Read-Only Memory (EPROM), Electrically Erasable Programmable Read-Only Memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

The invention claimed is:

1. An electronic device comprising:
   a proximity sensor; and
   a controller configured to execute processing of starting a timer or stopping the timer in response to a first type of gesture detected by the proximity sensor, increasing a set time of the timer in response to a second type gesture detected by the proximity sensor, and decreasing the set time of the timer in response to a third type of gesture detected by the proximity sensor,
   wherein,
   the controller is further configured to execute processing of closing a window for the set time of the timer in response to a fourth type of gesture detected by the proximity sensor,
   the second type of gesture and the third type of gesture are mutually reverse operations, and
   the first type of gesture and the fourth type of gesture are mutually reverse operations.

2. The electronic device according to claim 1, wherein the controller is configured to execute the processing of starting the timer, in response to the first type of gesture, when the timer is stopped, and stopping the timer, in response to the first type of gesture, when the timer is running.

3. A control method for controlling a processor, the control method comprising:
   executing processing of starting a timer or stopping the timer in response to a first type of gesture detected by a proximity sensor, increasing a set time of the timer in response to a second type gesture detected by the proximity sensor, and decreasing the set time of the timer in response to a third type of gesture detected by the proximity sensor; and
   executing processing of closing a window for the set time of the timer in response to a fourth type of gesture detected by the proximity sensor, wherein
the second type of gesture and the third type of gesture are mutually reverse operations, and
the first type of gesture and the fourth type of gesture are mutually reverse operations.

4. The control method according to claim 3, wherein
the executing processing executes the processing of starting the timer, in response to the first type of gesture, when the timer is stopped, and stopping the timer, in response to the first type of gesture, when the timer is running.

5. An electronic device comprising:
a proximity sensor; and
a controller configured to execute processing of starting a timer or stopping the timer in response to a first type of gesture detected by the proximity sensor, increasing a set time of the timer in response to a second type gesture detected by the proximity sensor, and decreasing the set time of the timer in response to a third type of gesture detected by the proximity sensor,
wherein
the controller turns on the proximity sensor when detecting that a predetermined mode is entered,
the controller is further configured to execute processing of closing a window for the set time of the timer in response to a fourth type of gesture detected by the proximity sensor,
the second type of gesture and the third type of gesture are mutually reverse operations, and
the first type of gesture and the fourth type of gesture are mutually reverse operations.

6. The electronic device according to claim 5, wherein
the controller is configured to execute the processing of starting the timer, in response to the first type of gesture, when the timer is stopped, and stopping the timer, in response to the first type of gesture, when the timer is running.

7. An electronic device comprising:
a proximity sensor; and
a controller configured to execute processing of starting a timer or stopping the timer in response to a first type of gesture detected by the proximity sensor, increasing a set time of the timer in response to a second type gesture detected by the proximity sensor, and decreasing the set time of the timer in response to a third type of gesture detected by the proximity sensor,
wherein
the controller determines whether a timer indication is included in a screen displayed on a display in response to another gesture detected by the proximity sensor, and, upon determining that the timer indication is included in the screen displayed on the display, executes the processing of starting the timer or stopping the timer in response to the first type of gesture, increasing the set time of the timer in response to the second type of gesture, and decreasing the set time of the timer in response to the third type of gesture,
the controller is further configured to execute processing of closing a window for the set time of the timer in response to a fourth type of gesture detected by the proximity sensor,
the second type of gesture and the third type of gesture are mutually reverse operations, and
the first type of gesture and the fourth type of gesture are mutually reverse operations.

8. The electronic device according to claim 7, wherein
the controller is configured to execute the processing of starting the timer, in response to the first type of gesture, when the timer is stopped, and stopping the timer, in response to the first type of gesture, when the timer is running.

9. A control method for controlling a processor, the control method comprising:
executing processing of starting a timer or stopping the timer in response to a first type of gesture detected by a proximity sensor, increasing a set time of the timer in response to a second type gesture detected by the proximity sensor, and decreasing the set time of the timer in response to a third type of gesture detected by the proximity sensor,
turning on the proximity sensor when detecting that a predetermined mode is entered, and
executing processing of closing a window for the set time of the timer in response to a fourth type of gesture detected by the proximity sensor,
wherein
the second type of gesture and the third type of gesture are mutually reverse operations, and
the first type of gesture and the fourth type of gesture are mutually reverse operations.

10. The control method according to claim 9, wherein
the executing processing executes the processing of starting the timer, in response to the first type of gesture, when the timer is stopped, and stopping the timer, in response to the first type of gesture, when the timer is running.

11. A control method for controlling a processor, the control method comprising:
executing processing of starting a timer or stopping the timer in response to a first type of gesture detected by a proximity sensor, increasing a set time of the timer in response to a second type gesture detected by the proximity sensor, and decreasing the set time of the timer in response to a third type of gesture detected by the proximity sensor,
determining whether a timer indication is included in a screen displayed on a display in response to another gesture detected by the proximity sensor,
upon determining that the timer indication is included in the screen displayed on the display, executing the processing of starting the timer or stopping the timer in response to the first type of gesture, increasing the set time of the timer in response to the second type of gesture, and decreasing the set time of the timer in response to the third type of gesture, and
executing processing of closing a window for the set time of the timer in response to a fourth type of gesture detected by the proximity sensor,
wherein
the second type of gesture and the third type of gesture are mutually reverse operations, and
the first type of gesture and the fourth type of gesture are mutually reverse operations.

12. The control method according to claim 11, wherein
the executing processing executes the processing of starting the timer, in response to the first type of gesture, when the timer is stopped, and stopping the timer, in response to the first type of gesture, when the timer is running.

* * * * *